(12) United States Patent
Krishna et al.

(10) Patent No.: US 12,602,023 B2
(45) Date of Patent: Apr. 14, 2026

(54) NON-STANDARD BUS CONTROLLER-BASED PROGRAMMABLE LOGIC DEVICE (PLD) ARCHITECTURE FOR INTERCONNECTING MULTIPLE BUS CONTROLLERS AND INCREASED NUMBERS OF PLD MODULES

(71) Applicant: GOODRICH ACTUATION SYSTEMS LIMITED, Wolverhampton (GB)

(72) Inventors: Rajeeva Krishna, Bangalore (IN); Robin David Hill, Solihull (GB); Stephen Potter, Nuneaton (GB); Ashish Vijay, Bikaner (IN); Rajesh Madathikandam, Bangalore (IN)

(73) Assignee: GOODRICH ACTUATION SYSTEMS LIMITED, Wolverhampton (GB)

( * ) Notice: Subject to any disclaimer, the term of this patent is extended or adjusted under 35 U.S.C. 154(b) by 392 days.

(21) Appl. No.: 18/320,933

(22) Filed: May 19, 2023

(65) Prior Publication Data

US 2024/0319699 A1 Sep. 26, 2024

(30) Foreign Application Priority Data

Mar. 23, 2023 (IN) .............................. 202311020307

(51) Int. Cl.
*G05B 19/05* (2006.01)

(52) U.S. Cl.
CPC .................................. *G05B 19/052* (2013.01)

(58) Field of Classification Search
CPC .................................................... G05B 19/052
See application file for complete search history.

(56) References Cited

U.S. PATENT DOCUMENTS

| | | | |
|---|---|---|---|
| 4,604,683 A | 8/1986 | Russ et al. | |
| 5,454,095 A * | 9/1995 | Kraemer | F02D 41/266 |
| | | | 709/213 |

(Continued)

FOREIGN PATENT DOCUMENTS

| | | |
|---|---|---|
| GB | 2256293 A | 12/1992 |
| JP | 2008228207 A | 9/2008 |

OTHER PUBLICATIONS

European Search Report for Application No. 24165837.6, mailed Sep. 3, 2024, 9 pages.

(Continued)

*Primary Examiner* — Henry Tsai
*Assistant Examiner* — Harry Z Wang
(74) *Attorney, Agent, or Firm* — CANTOR COLBURN LLP

(57) ABSTRACT

A bus controller-based programmable logic device (PLD) architecture is provided and includes a dual-port unit interposed between bus controllers. The dual port unit includes first and second data transfer layers. The first data transfer layer includes write and read areas for data transfer between the first and second bus controllers, respectively. A write to the read area is prevented during a read by the second bus controller. The second data transfer layer includes read and write areas for data transfer between the first and second bus controllers, respectively. A write to the read area is prevented during a read by the first bus controller.

17 Claims, 3 Drawing Sheets

(56)       References Cited

U.S. PATENT DOCUMENTS

| | | | |
|---|---|---|---|
| 5,771,227 | A | 6/1998 | Benayoun et al. |
| 7,725,680 | B1 | 5/2010 | Schmidt et al. |
| 7,882,278 | B2 | 2/2011 | Chadha et al. |
| 8,996,644 | B2 | 3/2015 | Pope |
| 9,064,560 | B2 | 6/2015 | Qawami et al. |
| 10,185,671 | B1 | 1/2019 | Khan et al. |
| 10,453,530 | B2 | 10/2019 | Lee et al. |
| 11,017,849 | B2 | 5/2021 | Oh et al. |
| 2008/0065837 | A1* | 3/2008 | Toyonaga ........... G06F 13/4059<br>711/148 |
| 2008/0229030 | A1* | 9/2008 | Ha ...................... G06F 13/1684<br>711/149 |
| 2009/0177831 | A1* | 7/2009 | Nemazie ............ G06F 13/4022<br>710/313 |
| 2012/0117318 | A1 | 5/2012 | Burton et al. |
| 2013/0097390 | A1* | 4/2013 | Hatula ................ G06F 13/1663<br>711/149 |
| 2014/0059263 | A1* | 2/2014 | Rosenberg ............ G06F 1/1632<br>710/303 |
| 2020/0218215 | A1* | 7/2020 | Quakernack ......... G05B 19/042 |

OTHER PUBLICATIONS

Ghosal et al. "SHAMP: An Experimental Shared Memory Multimicroprocessor System for Performance Evaluation of Parallel Algorithms", Microprocessing and Microprogramming 19 (1987) 179-192, pp. 179-192.

* cited by examiner

201/202

NON-STANDARD BUS CONTROLLER-BASED PROGRAMMABLE LOGIC DEVICE (PLD) ARCHITECTURE FOR INTERCONNECTING MULTIPLE BUS CONTROLLERS AND INCREASED NUMBERS OF PLD MODULES

CROSS-REFERENCE TO RELATED APPLICATIONS

This application claims the benefit of Indian Patent Application No. 202311020307 filed Mar. 23, 2023, the disclosure of which is incorporated herein by reference in its entirety.

BACKGROUND

The present disclosure relates to electrical systems and, in particular, to an electrical system having programmable logic devices (PLDs) with a non-standard bus controller-based PLD architecture.

A bus controller-based PLD device can have a bus as well as programmable logic device (PLD) modules attached to the bus and a bus controller. The bus controller may have bus control logic, interface logic, input multiplexing logic and memory pages. Together, these features of the bus controller allow for management of multiple functionalities of the PLD modules.

Nevertheless, a need remains for improved architecture that can handle greater numbers of PLD modules with tight synchronicity.

SUMMARY

According to an aspect of the disclosure, a bus controller-based programmable logic device (PLD) architecture is provided and includes a dual-port unit interposed between bus controllers. The dual port unit includes first and second data transfer layers. The first data transfer layer includes write and read areas for data transfer between the first and second bus controllers, respectively. A write to the read area is prevented during a read by the second bus controller. The second data transfer layer includes read and write areas for data transfer between the first and second bus controllers, respectively. A write to the read area is prevented during a read by the first bus controller.

In accordance with additional or alternative embodiments, the bus controller-based PLD architecture further includes thirty-one or more PLD modules and a command sequence execution by the first and second bus controllers is triggered by one of the PLD modules.

In accordance with additional or alternative embodiments, data is transferred along the first and second data transfer layers simultaneously.

In accordance with additional or alternative embodiments, the first data transfer layer includes a data transfer control unit configured to prevent the write to the read area of the first data transfer layer during the read by the second bus controller and the second data transfer layer includes a data transfer control unit configured to prevent the write to the read area of the second data transfer layer during the read by the first bus controller.

In accordance with additional or alternative embodiments, the data transfer control unit of the first data transfer layer is further configured to write data, which is prevented from being written to the read area of the first data transfer layer during the read by the second bus controller, to the write area of the first data transfer layer during the read by the second bus controller and the data transfer control unit of the second data transfer layer is further configured to write data, which is prevented from being written to the read area of the second data transfer layer during the read by the first bus controller, to the write area of the second data transfer layer during the read by the first bus controller.

In accordance with additional or alternative embodiments, the data transfer control unit of the first data transfer layer is further configured to mirror data in one system clock, which is written to the write area of the first data transfer layer, to the read area of the first data transfer layer following the read by the second bus controller and the data transfer control unit of the second data transfer layer is further configured to mirror data in one system clock, which is written to the write area of the second data transfer layer, to the read area of the second data transfer layer following the read by the first bus controller.

According to an aspect of the disclosure, a bus controller-based programmable logic device (PLD) architecture is provided and includes PLD modules, first and second bus controllers each responsive to a trigger by one of the PLD modules and a dual-port unit interposed between the first and second bus controllers. The dual port unit includes first and second data transfer layers. The first data transfer layer includes write and read areas for data transfer between the first and second bus controllers, respectively. A write to the read area is prevented during a read by the second bus controller. The second data transfer layer includes read and write areas for data transfer between the first and second bus controllers, respectively. A write to the read area is prevented during a read by the first bus controller.

In accordance with additional or alternative embodiments, the PLD modules include up to thirty-one or more PLD modules.

In accordance with additional or alternative embodiments, each of the first and second bus controllers includes control logic, interface logic, input multiplexing logic and memory.

In accordance with additional or alternative embodiments, data is transferred along the first and second data transfer layers simultaneously.

In accordance with additional or alternative embodiments, the first data transfer layer includes a data transfer control unit configured to prevent the write to the read area of the first data transfer layer during the read by the second bus controller and the second data transfer layer includes a data transfer control unit configured to prevent the write to the read area of the second data transfer layer during the read by the first bus controller.

In accordance with additional or alternative embodiments, the data transfer control unit of the first data transfer layer is further configured to write data, which is prevented from being written to the read area of the first data transfer layer during the read by the second bus controller, to the write area of the first data transfer layer during the read by the second bus controller and the data transfer control unit of the second data transfer layer is further configured to write data, which is prevented from being written to the read area of the second data transfer layer during the read by the first bus controller, to the write area of the second data transfer layer during the read by the first bus controller.

In accordance with additional or alternative embodiments, the data transfer control unit of the first data transfer layer is further configured to mirror data in one system clock, which is written to the write area of the first data transfer layer, to the read area of the first data transfer layer following the read by the second bus controller and the data transfer control unit of the second data transfer layer is further configured to mirror data in one system clock, which is written to the write area of the second data transfer layer, to the read area of the second data transfer layer following the read by the first bus controller.

According to an aspect of the disclosure, a method of operating a bus controller-based programmable logic device (PLD) architecture including PLD modules and first and second bus controllers is provided. The method includes receiving a trigger from one of the PLD modules at one of the first and second bus controllers and executing a command sequence by the one of the first and second bus controllers by exchanging data between the first and second bus controllers across a dual-port unit comprising first and second data transfer layers. The exchanging of the data includes reading, from a read area of the first data transfer layer, by the second bus controller and preventing a write to the read area during the reading by the second bus controller and reading, from a read area of the second data transfer layer, by the first bus controller and preventing a write to the read area during the reading by the first bus controller.

In accordance with additional or alternative embodiments, the PLD modules include up to thirty-one or more PLD modules.

In accordance with additional or alternative embodiments, each of the first and second bus controllers includes control logic, interface logic, input multiplexing logic and memory.

In accordance with additional or alternative embodiments, data is transferred along the first and second data transfer layers simultaneously.

In accordance with additional or alternative embodiments, the preventing of the write to the read area of the first data transfer layer during the reading by the second bus controller is executed by a data transfer control unit of the first data transfer layer and the preventing of the write to the read area of the second data transfer layer during the reading by the first bus controller is executed by a data transfer control unit of the second data transfer layer.

In accordance with additional or alternative embodiments, the method further includes writing data, which is prevented from being written to the read area of the first data transfer layer during the reading by the second bus controller, to the write area of the first data transfer layer by the data transfer control unit of the first data transfer layer during the reading by the second bus controller and writing data, which is prevented from being written to the read area of the second data transfer layer during the reading by the first bus controller, to the write area of the second data transfer layer by the data transfer control unit of the second data transfer layer during the reading by the first bus controller.

In accordance with additional or alternative embodiments, the method further includes mirroring data in one system clock, which is written to the write area of the first data transfer layer, to the read area of the first data transfer layer by the data transfer control unit of the first data transfer layer following the reading by the second bus controller and mirroring data in one system clock, which is written to the write area of the second data transfer layer, to the read area of the second data transfer layer by the data transfer control unit of the second data transfer layer following the reading by the first bus controller Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

While a conventional bus controller-based PLD device can be characterized in that a bus controller manages multiple functionalities of the PLD modules, the conventional bus controller-based PLD device cannot provide a solution for more than a certain number of PLD modules (i.e., 31 PLD modules). Also, the conventional bus controller-based PLD cannot handle cases in which an application requires synchronization of data and control for multiple motor controllers, multiple digital bus controllers or one motor controller with a digital bus controller. In these or other cases, a bus controller command sequence can be triggered by only one system event whereupon the bus controller command sequence will run sequentially following the event. One bus controller therefore cannot manage two or more than two system triggers.

Thus, as will be described below, bus controller-based PLD architecture is provided with multiple bus controllers and a mechanism by which the multiple bus controllers communicate. That is, a dual port-based architecture is provided which connects two (or more) bus controllers and transfers data according to the following: (1) to provide a mechanism for data exchange between two independently operating bus controllers with associated paged memories, (2) to define one custom memory page with separate write and read areas for each of the bus controllers, (3) to provide a configurable trigger location characterized in that a write to this location by a bus controller triggers copying of the updated (WS—write status set) write data to the read area of the other bus controller page, (4) to provide a fixed write disable (locks) register (location 0 of write area) so that a write to this location by a bus controller protects read data from being overwritten by the copy operation of the other bus controller during a read operation and (5) to support configurable depth (configurable for each data transfer pair) and page number.

Figure 1:
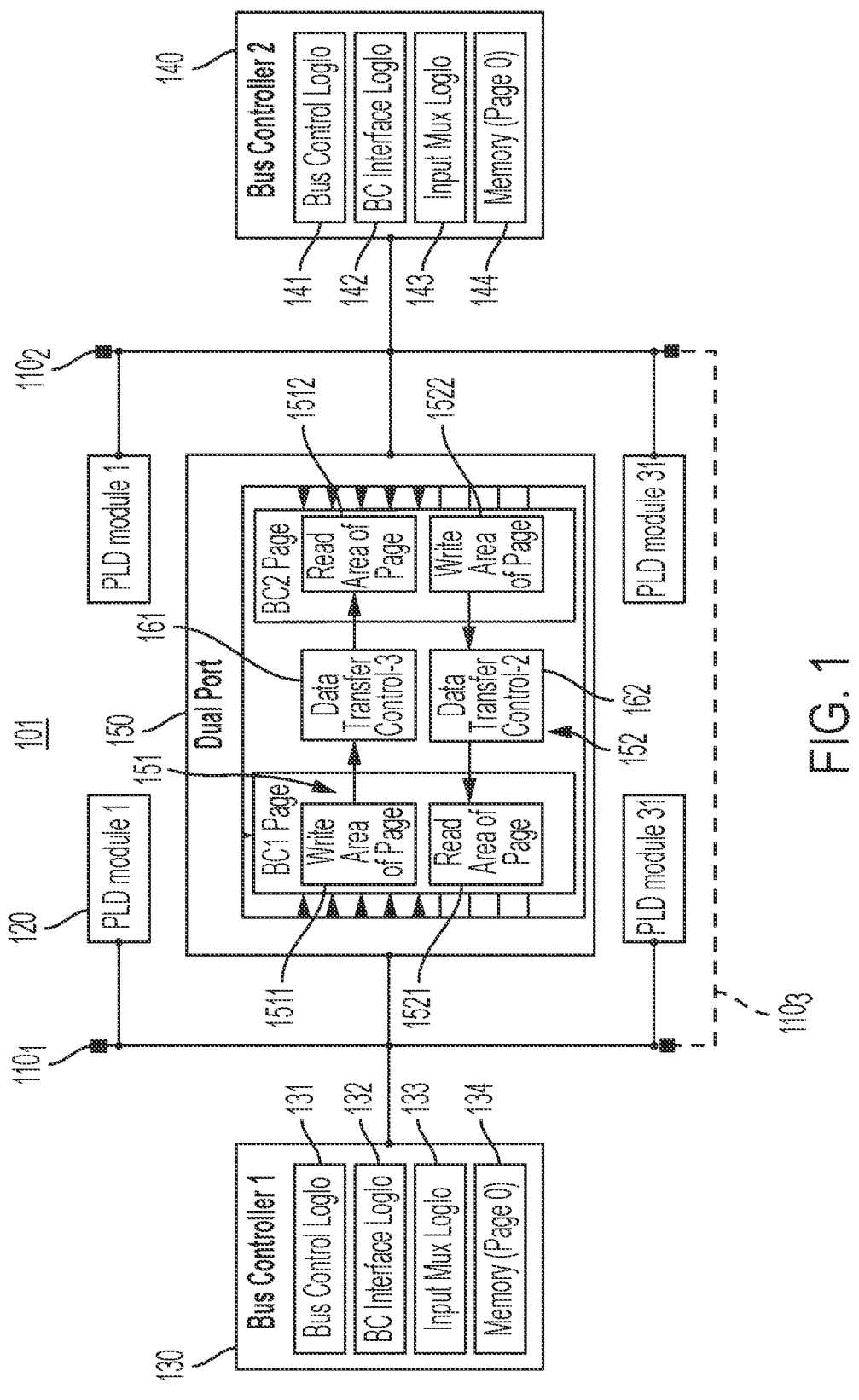
FIG. 1 is a schematic diagram of a bus controller-based PLD architecture in accordance with embodiments.
Figure 2:
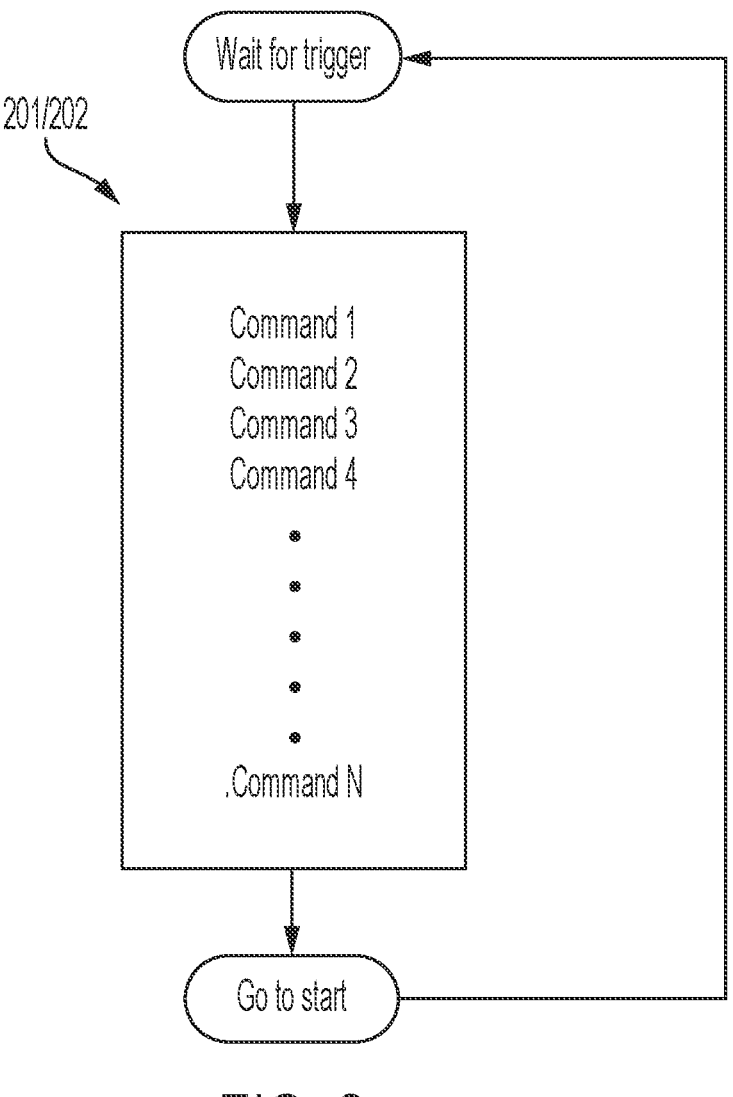
FIG. 2 is an illustration of a command sequence executable by a bus controller of the bus controller-based PLD architecture of FIG. 1 in accordance with embodiments.

With reference to FIGS. 1 and 2, a bus controller-based PLD architecture 101 is provided and includes busses $110_1$ and $110_2$, PLD modules 120 coupled to the busses $110_1$ and $110_2$ (i.e., up to thirty-one or more PLD modules 120 can be coupled to the busses $110_1$ and $110_2$), a first bus controller 130, a second bus controller 140 and a dual-port unit 150. The busses $110_1$ and $110_2$ can be separate from one another or tied together by a further bus $110_3$. In the case of the busses $110_1$ and $110_2$ being separate from one another, there can be one bus controller per bus in the bus controller-based PLD architecture 101. The first bus controller 130 is coupled to the bus $110_1$ and is configured to execute a command sequence 201 (see FIG. 2) responsive to a trigger by one of the PLD modules 120. The second bus controller 140 is coupled to the bus $110_2$ and is configured to execute another command sequence 202 (see FIG. 2) responsive to a trigger by another one of the PLD modules 120. The dual-port unit 150 is communicatively interposed between the first bus controller 130 and the second bus controller 140.

The first bus controller 130 includes control logic 131, interface logic 132, input multiplexing logic 133 and memory 134. The second bus controller 140 includes control logic 141, interface logic 142, input multiplexing logic 143 and memory 144.

The dual-port unit 150 includes a first data transfer layer 151 and a second data transfer layer 152 such that data is transferred between the first and second bus controllers 130 and 140 along the first and second data transfer layers 151 and 152 simultaneously. The first data transfer layer 151 includes a write area 1511 and a read area 1512 for data transfer between the first and second bus controllers 130 and 140, respectively, with a write to the read area 1512 being prevented during a read of the read area 1512 by the second bus controller 140. The second data transfer layer 152 includes a read area 1521 and a write area 1522 for command sequence execution by the first and second bus controllers 130 and 140, respectively, with a write to the read area 1521 being prevented during a read of the read area 1521 by the first bus controller 130.

The first data transfer layer 151 further includes a data transfer control unit 161, which is interposed between the write area 1511 and the read area 1512, and which is configured to prevent the write to the read area 1512 during the read by the second bus controller 140. The data transfer control unit 161 of the first data transfer layer 151 is further configured to write data, which is prevented from being written to the read area 1512 of the first data transfer layer 151 during the read by the second bus controller 140, to the write area 1511 of the first data transfer layer 151 during the read by the second bus controller 140. The data transfer control unit 161 of the first data transfer layer 151 is also further configured to mirror data in one system clock, which is written to the write area 1511 of the first data transfer layer 151, to the read area 1512 of the first data transfer layer 151 following the read by the second bus controller 140.

The second data transfer layer 152 further includes a data transfer control unit 162, which is interposed between the read area 1521 and the write area 1522, and which is configured to prevent the write to the read area 1521 during the read by the first bus controller 130. The data transfer control unit 162 of the second data transfer layer 152 is further configured to write data, which is prevented from being written to the read area 1521 of the second data transfer layer 152 during the read by the first bus controller 130, to the write area 1522 of the second data transfer layer 152 during the read by the first bus controller 130. The data transfer control unit 162 of the second data transfer layer 152 is also further configured to mirror data in one system clock, which is written to the write area 1522 of the second data transfer layer 152, to the read area 1521 of the second data transfer layer 152 following the read by the first bus controller 130.

With the configurations described above, in an event that a first triggering event takes place by a first PLD module 120 with respect to the first bus controller 130 and subsequently a second triggering event takes place by a second PLD module 120 with respect to the second bus controller 140, the command sequences executed by each of the first and second bus controllers 130 and 140 across the dual-port unit 150 can be executed simultaneously or substantially simultaneously. This can be done, for example, using multiple first data transfer layers 151 and multiple second data transfer layers 152 or by segregating lines of the write area 1511 and the read area 1512 of the first data transfer layer 151 and of the read area 1521 and the write area 1522 in the second data transfer layer 152.

Figure 3:
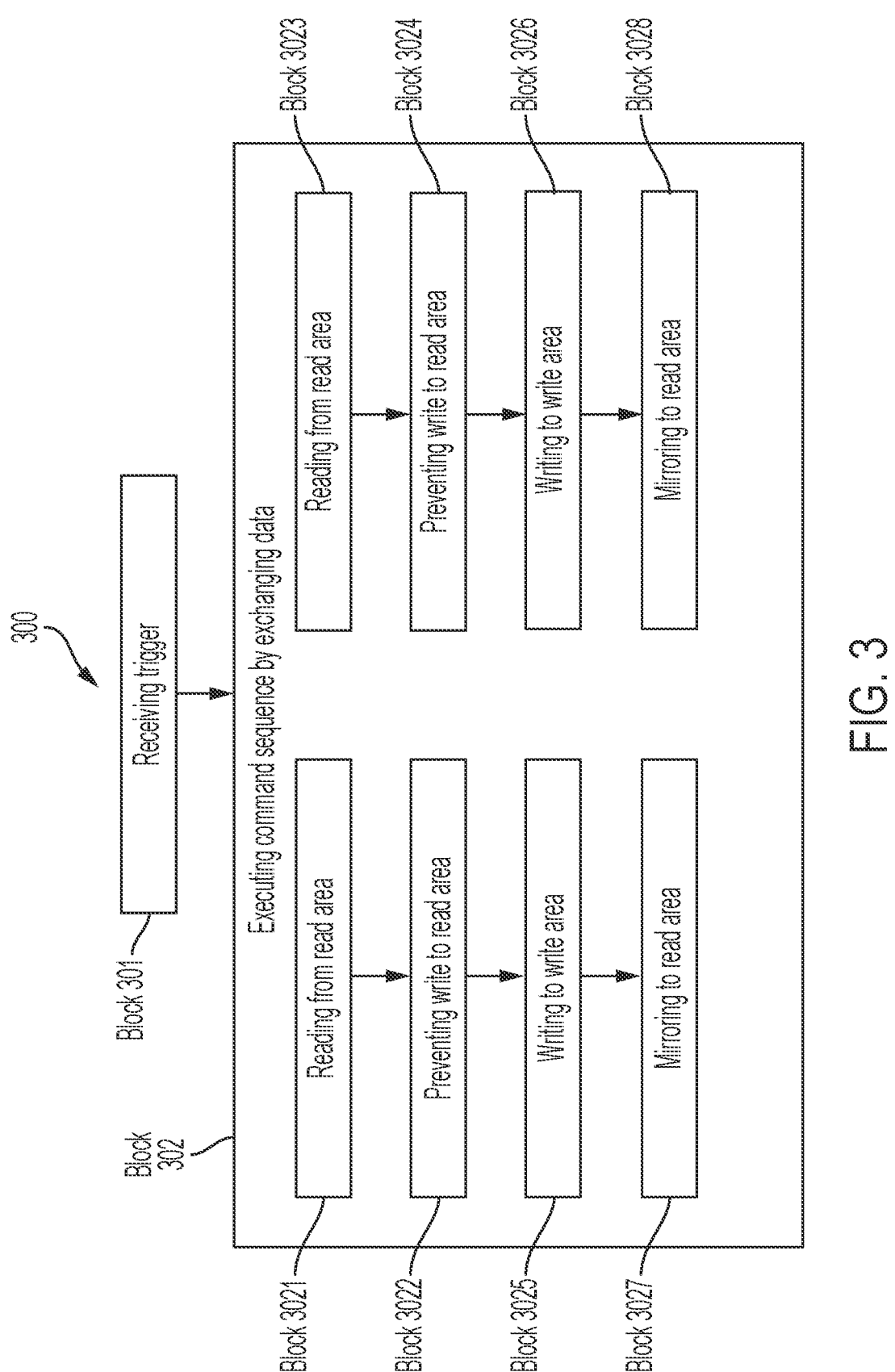
FIG. 3 is a method of operating a bus controller-based PLD architecture in accordance with embodiments.

With reference to FIG. 3, a method 300 of operating a bus controller-based PLD architecture in which PLD modules and first and second bus controllers are coupled to busses is provided (as described above). As shown in FIG. 3, the method includes receiving a trigger from one of the PLD modules at one of the first and second bus controllers (block 301) and executing a command sequence by the one of the first and second bus controllers by exchanging data between the first and second bus controllers across a dual-port unit comprising first and second data transfer layers (block 302). The exchanging of the data of block 302 includes reading, from a read area of the first data transfer layer, by the second bus controller (block 3021) and preventing, by a data transfer control unit of the first data transfer layer, a write to the read area during the reading by the second bus controller (block 3022) and reading, from a read area of the second data transfer layer, by the first bus controller (block 3023) and preventing, by a data transfer control unit of the second data transfer layer, a write to the read area during the reading by the first bus controller (block 3024).

The method 300 can further include writing data, which is prevented from being written to the read area of the first data transfer layer during the reading by the second bus controller, to the write area of the first data transfer layer by the data transfer control unit of the first data transfer layer during the reading by the second bus controller (block 3025) and writing data, which is prevented from being written to the read area of the second data transfer layer during the reading by the first bus controller, to the write area of the second data transfer layer by the data transfer control unit of the second data transfer layer during the reading by the first bus controller (block 3026).

The method 300 can also include mirroring data in one system clock, which is written to the write area of the first data transfer layer, to the read area of the first data transfer layer by the data transfer control unit of the first data transfer layer following the reading by the second bus controller (block 3027) and mirroring data in one system clock, which is written to the write area of the second data transfer layer, to the read area of the second data transfer layer by the data transfer control unit of the second data transfer layer following the reading by the first bus controller (block 3028).

Technical effects and benefits of the present disclosure are the provision of a bus controller-based PLD architecture that can be developed without modification with bus controllers to support more than a certain number of PLD modules (i.e., up to or more than 31 PLD modules) with a required level of synchronization of data and control flow.

The corresponding structures, materials, acts, and equivalents of all means or step-plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A bus controller-based programmable logic device (PLD) architecture, comprising:
    a dual-port unit interposed between first and second bus controllers and comprising:
        a first data transfer layer comprising write and read areas for data transfer between the first and second bus controllers, respectively, and a data transfer control unit interposed between the write area and the read area and configured to prevent writing of data to the read area of the first data transfer layer, from the write area, during reading from the read area by the second bus controller; and
        a second data transfer layer comprising read and write areas for data transfer between the first and second bus controllers, respectively, and a data transfer control unit interposed between the read area and the write area and configured to prevent writing of data to the read area of the second data transfer layer, from the write area, during reading from the read area by the first bus controller.

2. The bus controller-based PLD architecture according to claim 1, further comprising thirty-one or more PLD modules, wherein command sequence execution by the first and second bus controllers is triggered by one of the PLD modules.

3. The bus controller-based PLD architecture according to claim 1, wherein data is transferred along the first and second data transfer layers simultaneously.

4. The bus controller-based PLD architecture according to claim 1, wherein:
    the data transfer control unit of the first data transfer layer is further configured to write data, which is prevented from being written to the read area of the first data transfer layer during the reading by the second bus controller, to the write area of the first data transfer layer during the reading by the second bus controller, and
    the data transfer control unit of the second data transfer layer is further configured to write data, which is prevented from being written to the read area of the second data transfer layer during the reading by the first bus controller, to the write area of the second data transfer layer during the reading by the first bus controller.

5. The bus controller-based PLD architecture according to claim 4, wherein:
    the data transfer control unit of the first data transfer layer is further configured to mirror data in one system clock, which is written to the write area of the first data transfer layer, to the read area of the first data transfer layer following the reading by the second bus controller, and
    the data transfer control unit of the second data transfer layer is further configured to mirror data in one system clock, which is written to the write area of the second data transfer layer, to the read area of the second data transfer layer following the reading by the first bus controller.

6. A bus controller-based programmable logic device (PLD) architecture, comprising:
    PLD modules;
    first and second bus controllers each responsive to a trigger by one of the PLD modules; and
    a dual-port unit interposed between the first and second bus controllers and comprising:
        a first data transfer layer comprising write and read areas for data transfer between the first and second bus controllers, respectively, and a data transfer control unit interposed between the write area and the read area and configured to prevent writing of data to the read area of the first data transfer layer, from the write area, during reading from the read area by the second bus controller; and
        a second data transfer layer comprising read and write areas for data transfer between the first and second bus controllers, respectively, and a data transfer control unit interposed between the read area and the write area and configured to prevent writing of data to the read area of the second data transfer layer, from the write area, during reading from the read area by the first bus controller.

7. The bus controller-based PLD architecture according to claim 6, wherein the PLD modules comprise up to thirty-one or more PLD modules.

8. The bus controller-based PLD architecture according to claim 6, wherein each of the first and second bus controllers comprises control logic, interface logic, input multiplexing logic and memory.

9. The bus controller-based PLD architecture according to claim 6, wherein data is transferred along the first and second data transfer layers simultaneously.

10. The bus controller-based PLD architecture according to claim 6, wherein:
    the data transfer control unit of the first data transfer layer is further configured to write data, which has been prevented from being written to the read area of the first data transfer layer during the read by the second bus controller, to the write area of the first data transfer layer during the reading by the second bus controller, and
    the data transfer control unit of the second data transfer layer is further configured to write data, which has been prevented from being written to the read area of the second data transfer layer during the read by the first bus controller, to the write area of the second data transfer layer during the reading by the first bus controller.

11. The bus controller-based PLD architecture according to claim 10, wherein:
    the data transfer control unit of the first data transfer layer is further configured to mirror data in one system clock, which has been written to the write area of the first data transfer layer, to the read area of the first data transfer layer subsequent to the read by the second bus controller, and
    the data transfer control unit of the second data transfer layer is further configured to mirror data in one system clock, which has been written to the write area of the second data transfer layer, to the read area of the second data transfer layer subsequent to the read by the first bus controller.

12. A method of operating a bus controller-based programmable logic device (PLD) architecture comprising PLD modules and first and second bus controllers, the method comprising:

receiving a trigger from one of the PLD modules at one of the first and second bus controllers; and executing a command sequence by the one of the first and second bus controllers by exchanging data between the first and second bus controllers across a dual-port unit comprising first and second data transfer layers, the exchanging of the data comprising:

reading, from a read area of the first data transfer layer, by the second bus controller and preventing writing of data to the read area of the first data transfer layer, from the write area, during the reading from the read area by the second bus controller by a data transfer control unit of the first data transfer layer, which is interposed between the write area and the read area; and reading, from a read area of the second data transfer layer, by the first bus controller and preventing writing of data to the read area of the second data transfer layer, from the write area, during the reading from the read area by the first bus controller by a data transfer control unit of the second data transfer layer, which is interposed between the read area and the write area.

13. The method according to claim 12, wherein the PLD modules comprise up to thirty-one or more PLD modules.

14. The method according to claim 12, wherein each of the first and second bus controllers comprises control logic, interface logic, input multiplexing logic and memory.

15. The method according to claim 12, wherein data is transferred along the first and second data transfer layers simultaneously.

16. The method according to claim 12, wherein the method further comprises:

writing data, which has been prevented from being written to the read area of the first data transfer layer during the reading by the second bus controller, to the write area of the first data transfer layer by the data transfer control unit of the first data transfer layer during the reading by the second bus controller, and writing data, which has been prevented from being written to the read area of the second data transfer layer during the reading by the first bus controller, to the write area of the second data transfer layer by the data transfer control unit of the second data transfer layer during the reading by the first bus controller.

17. The method according to claim 16, wherein the method further comprises:

mirroring data in one system clock, which has been written to the write area of the first data transfer layer, to the read area of the first data transfer layer by the data transfer control unit of the first data transfer layer subsequent to the reading by the second bus controller, and mirroring data in one system clock, which has been written to the write area of the second data transfer layer, to the read area of the second data transfer layer by the data transfer control unit of the second data transfer layer subsequent to the reading by the first bus controller.

* * * * *